Patented Oct. 18, 1949

2,485,327

UNITED STATES PATENT OFFICE 2,485,327

PHENOL ALDEHYDE-PETROLEUM PITCH-DRYING OIL IMPREGNATING COMPOSITION

Howard Snow, Charlotte, N. C., assignor to Southern Friction Materials Company, a corporation of North Carolina No Drawing. Application September 27, 1946, Serial No. 699,641

8 Claims. (Cl. 260—19)

This invention relates to an impregnating chemical composition that is especially adapted for impregnating woven textile fabric. This is a continuation-in-part of my copending application Serial No. 490,877, filed June 15, 1943, now abandoned.

The composition of the present invention imparts to the fabric a markedly high water and wear resistance, rendering it suitable for use as shoe soling, floor covering, and other similar applications, especially when the impregnated product is surface finished as described in my copending application Serial No. 467,620, filed December 2, 1942, now U. S. Patent 2,424,861. Because of the chemical nature of this composition and the incorporation thereof in the fabric in unusually large quantities, the resulting impregnated product has new and advantageous characteristics that render it especially adaptable for use as a leather substitute and the like.

The percent solids content of my composition may vary substantially with different uses. However, when the composition is employed for impregnating fabric to produce a leather substitute, I have found it advantageous to utilize a high percentage, such as for example 60% to 90% solids, by weight. A composition of such solids content generally requires heating to obtain easy handling and impregnation of fabrics therewith but it makes it possible for the fabric to attain the high pick-up or gain in weight which is required to produce the improved artificial leather products of my invention.

Certain unique and outstandnig characteristics of my composition, especially for imparting water and wear resistance to fabrics, result from the combination of several compatible chemical substances that coact with each other. The properties of each constituent complement those of the other constituents with regard to stability, plasticity of flexibility, water repellance and wear resistance; all of which are desired for the commercial uses of my composition. These and other desirable features are provided fundamentally by a combination of: an oil soluble thermosetting resin, mineral oil polymers, a drying oil, and a suitable organic solvent.

In this combination, the thermosetting resin provides the desired hardness and wear resistance that characterize my product. Suitable resins for this component of the composition are the phenolic resins, e. g., phenol-formaldehyde resins such as are identified in the trade as "Durite 1301," "Amberol ST137," and "Durez 11696"; modified phenol-aldehyde resins, e. g. phenol-formaldehyde modified with rosin, such as Amberol M-93, or ester gum modified phenol formaldehyde, such as Phenac 62214; and oil modified phenolic resins, such as "Bakelite 17932" which is an oil modified phenol-formaldehyde resin. Also, resins such as ester gum may be used, which are formed by combining a resin of acid nature, such as rosin, with phenol or an alcohol, such as glycerol.

For augmenting the penetrating characteristics of the composition and increasing its affinity for the treated material, an unsaturated viscous liquid of petroleum origin, which is sometimes referred to in the trade as "petroleum pitch," and which is identified hereafter as "mineral oil polymers," is employed. An illustrative example of the latter is "Pur-O-Resin 2138" which has the following published characteristics: specific gravity 60°/60° F., 0.993; A. P. I. gravity (approx.), 11; viscosity Saybolt Universal at 210° F., 275-325; pour point, 45° min.; solid content (A. S. T. M. D-154-28), 90% min.; iodine number (Wijs modified), 200 min.; saponification number, 1.0 max., beginning boiling range, 450° F. This material is reactive with drying oils and is composed of polymerized olefinic hydrocarbons.

To provide the desired flexibility and tensile strength in the treated material, and to modify somewhat the hardness properties of the resins, the composition also contains as a major constituent, a drying or semi-drying oil. A commercially advantageous example of such an oil is linseed oil. Other examples of suitable drying oils which may be used are, China-wood oil, oiticica oil, perilla oil, soya bean oil, dehydrated castor oil, cashew-nut shell oil, and synthetic drying oils such as "Highland G" oil which has the following characteristics; viscosity G (G and H); specific gravity 0.977; iodine value 0.145; saponification value 215; derivative of native linseed oil with the break removed; temperature tolerance and resin tolerance equal to linseed oil. This oil may advantageously be combined with linseed oil or other drying or semi-drying oils for use in my composition.

Another synthetic drying oil which may be used in my composition is "Hyodol Glycerides," which is obtained by splitting the glycerine from fish oil, such as sardine oil, followed by fractionating the fish oil acids and finally reesterifying the fraction consisting partially of clupanodonic acid. The resulting product, "Hyodol Glycerides," is the glyceride of clupanodonic acid and similar highly unsaturated fatty acids. It is characterized by an acid number of about 5 to 8, iodine number of 214 to 220 and viscosity (Gardner)

A–B. For sake of convenience this product will be referred to hereafter as "clupanodonic glyceride." It is especially useful in my composition in combination with linseed oil, to augment the water repellent properties of the composition. Furthermore, this product is compatible with the other oils and resins used in my composition and has an especial affinity for combining with the mineral oil polymers. A commercially advantageous combination for purposes of my invention is a mixture of linseed oil and clupanodonic glyceride to provide the water repellent drying oil constituent of my impregnating composition.

In addition to the drying oil properties provided by the clupanodonic glyceride, it also possesses certain plasticizing properties that render the hard resin or gum constituent less brittle and therefore more flexible and suitable for impregnating material which is to be used for shoe soles or other substitute leather products that require flexing properties in their regular use. Where greater flexibility and plasticity are required for the composition, in preference to increased hardness, a portion of the hard resin or gum in my composition may be replaced by the clupanodonic glyceride or by another suitable synthetic drying oil, such as for example the above mentioned "Highland G" or modified linseed oil.

To obtain the desired fluidity and thinness of the composition, a suitable organic solvent or thinner is incorporated. These materials are generally identified as mineral spirits solvents, of which petroleum distillate solvents are a good example. Coal tar distillate solvents may also be employed. Examples of suitable commercial solvents are xylol; benzol; and the petroleum thinners, "Varsol" and "Solvesso" "Amsco Spirits" and VM&P solvent. All of these trade-marked products are well known, light petroleum distillates and are widely available in commercial quantities.

The following illustrative but non-limiting examples of my impregnating composition show some of the specific, alternative, combinations of constituents that may be used for producing different types of impregnated products, or for different manufacturing procedures:

*Example I*

| | Pounds |
|---|---|
| Thermosetting resin or gum e. g., ester gum | 20 |
| Mineral oil polymers, e. g., "Pur-O-Resin" | 40 |
| Drying oil, e. g., linseed oil | 30 |
| Clupanodonic glyceride | 10 |
| Solvent, "VM&P" solvent | 45 |
| | 145 |

*Example II*

| | Pounds |
|---|---|
| Phenol formaldehyde resin | 20 |
| Mineral oil polymers, e. g., "Pur-O-Resin" | 40 |
| Drying oil, e. g., China-wood oil | 40 |
| Solvent, e. g., "Solvesso" | 10 |
| | 110 |

The procedure used for preparation of the compositions disclosed in Examples I and II above is as follows: The thermosetting gum or resin, mineral oil polymers, and drying oil, are heated together to a suitable temperature which may vary from about 300° F. to about 550° F. depending upon the exact types of constituents used. The heating is continued until the resin or gum, mineral oil polymers and drying oil react and combine with each other and until the resulting solution has reached the proper viscosity, as indicated, for example, by the formation of a small, soft ball when removed from the kettle. The solvent, with driers added if necessary, may be heated to a suitable temperature, e. g., 150° F. (although this heating is not essential), and is thoroughly mixed with the above heat reaction to form the complete composition.

Additional specific but non-limiting examples of the impregnating composition and methods of their preparation are as follows:

*Example III*

| | Parts |
|---|---|
| Thermosetting resin or gum, e. g., "Bakelite" | 20 |
| Mineral oil polymers, e. g., "Pur-O-Resin" | 30 |
| Drying oil, e. g.: | |
|   Boiled linseed | 20 |
|   Cicoil | 25 |
| Solvent, e. g., mineral spirits | 75 |
| Driers, e. g.: | |
|   6% iron naphthenate | 0.25 |
|   8% zinc naphthenate | 0.05 |
|   6% manganese naphthenate | 0.03 |

The boiled linseed oil and "Pur-O-Resin" are mixed and heated to 400° F. The mix is then checked to 350° F. with cicoil, and the "Bakelite" resin is added and the temperature is held at 350° F. until the resin is melted in and mixed well. Then, 10 to 20 parts of solvent are added, after which the composition is allowed to cool while the remaining solvent and driers are added. The resulting composition has a specific gravity of about .875 at 110° F.

*Example IV*

| | Parts |
|---|---|
| Thermosetting resin or gum, e. g., "Pentalyn" | 15 |
| Mineral oil polymers, e. g., "Pur-O-Resin" | 40 |
| Drying oil, e. g.: | |
|   Boiled linseed | 20 |
|   Cicoil | 25 |
| Solvent, e. g., mineral spirit | 75 |
| Driers, e. g.,: | |
|   6% iron naphthenate | 0.25 |
|   8% zinc naphthenate | 0.05 |
|   6% manganese naphthenate | 0.03 |

The cicoil, boiled linseed, and "Pur-O-Resin" are mixed and heated to 300° F. The resin is then added and the temperature is increased to 400° F. and held until the proper viscosity is reached. 10–20 parts of solvent are added, and the composition is allowed to cool while the remaining solvent and driers are added. The specific gravity of the resulting composition is about .875 at 110° F., as above.

The weight of the complete, penetrative, impregnating composition that is absorbed by the fabric during the treatment will vary from 50% to 100% of the original dry weight of the untreated fabric. And these percentages correspond generally to 35% to 50% of impregnant solids in the finished product after removal of volatiles.

It will be understood that the composition of my invention is not limited to the manufacture of artificial leather or the like, but may be used for any and all of the general impregnating applications to provide a water resistant and wear resistant substance. The basic features of the composition of my invention comprise the above described combination of an oil soluble thermosetting resin, or gum, mineral oil polymers, drying oil and solvent. The ranges of proportions of these several constituents are illustrated by the following:

| Ingredients: | Parts by weight |
| --- | --- |
| Thermosetting resin or gum | 1½–2 |
| Mineral oil polymers | 3–4 |
| Drying oil | 4–5½ |
| Solvent | 1–7½ |

Usually it is preferable to use a high solvent proportion because of the better penetration obtained and employ a two-dip treating process for impregnating although the solvent percentage may be lowered if desired, as noted above, to condition the composition for a single-dip treatment process.

I claim:

1. A liquid composition for impregnating fabric to render it water and wear resistant comprising: the thermosetting heat reaction products of, an oil-soluble resin reselected from the group consisting of phenol-aldehydes, oil-modified phenol-aldehydes, and rosin ester-modified phenol-aldehydes, petroleum pitch composed of polymerized olefinic hydrocarbons and having a minimum iodine number of about 200 and a boiling range beginning at 450° F., and a drying oil; and a petroleum distillate solvent; the proportions by weight of said constituents being 1½ to 2 parts of said resin, 3 to 4 parts of said pitch, 4 to 5½ parts of said drying oil, and 1 to 7½ parts of said solvent.

2. The method of preparing a composition as defined in claim 1, comprising heating together the oil-soluble resin, petroleum pitch, and drying oil constituents at a temperature of about 300° F. to 550° F. for a sufficient length of time to effect a reaction between the constituents and render the composition more viscous than it was before heating, and then mixing the reacted composition with said solvent.

3. A liquid composition for impregnating fabric to render it water and wear resistant comprising: the thermosetting heat reaction products of, an oil modified phenol formaldehyde resin, petroleum pitch composed of polymerized olefinic hydrocarbons and having a minimum iodine number of about 200 and a boiling range beginning at 450° F., and a drying oil; and a petroleum distillate solvent; the proportions by weight of said constituents being 1½ to 2 parts of said resin, 3 to 4 parts of said pitch, 4 to 5½ parts of said drying oil, and 1 to 7½ parts of said solvent.

4. The method of preparing a composition as defined in claim 3, comprising heating together the phenol formaldehyde resin, petroleum pitch, and drying oil constituents at a temperature of about 300° F. to 550° F. for a sufficient length of time to effect a reaction between the constituents and render the composition more viscous than it was before heating, and then mixing the reacted composition with said solvent.

5. A liquid composition for impregnating fabric to render it water and wear resistant comprising: the thermosetting heat reaction products of, phenol formaldehyde, petroleum pitch composed of polymerized olefinic hydrocarbons and having a minimum iodine number of about 200 and a boiling range beginning at 450° F., and a drying oil; and a petroleum distillate solvent; the proportions by weight of said constituents being 1½ to 2 parts of said resin, 3 to 4 parts of said pitch, 4 to 5½ parts of said drying oil, and 1 to 7½ parts of said solvent.

6. A liquid composition for impregnating fabric to render it water and wear resistant comprising: the thermosetting heat reaction products of, rosin ester, modified phenol formaldehyde resin, petroleum pitch composed of polymerized olefinic hydrocarbons and having a minimum iodine number of about 200 and a boiling range beginning at 450° F., and a drying oil; and a petroleum distillate solvent; the proportions by weight of said constituents being 1½ to 2 parts of said resin, 3 to 4 parts of said pitch, 4 to 5½ parts of said drying oil, and 1 to 7½ parts of said solvent.

7. A liquid composition for impregnating fabric to render it wear and water resistant comprising: the thermosetting heat reaction products of, an oil-soluble resin selected from the class consisting of phenol-aldehydes, oil-modified phenol-aldehydes, and rosin ester-modified phenol-aldehydes, petroleum pitch composed of polymerized olefinic hydrocarbons and having a minimum iodine number of about 200 and a boiling range beginning at 450° F., and a drying oil; and an organic solvent selected from the class consisting of petroleum distillate solvents and coal tar distillate solvents; the proportions by weight of said constituents being 1½ to 2 parts of said resin, 3 to 4 parts of said pitch, 4 to 5½ parts of said drying oil, and 1 to 7½ parts of said solvent.

8. The method of preparing a composition as defined in claim 7, comprising heating together the oil-soluble resin, petroleum pitch, and drying oil constituents at a temperature of about 300° F. to 550° F. for a sufficient length of time to effect a reaction between the constituents and render the composition more viscous than it was before heating, and then mixing the reacted composition with said solvent.

HOWARD SNOW.

REFERENCES CITED

The following references are of record in the file of this patent:

UNITED STATES PATENTS

| Number | Name | Date |
| --- | --- | --- |
| 2,371,652 | Rostler et al. | Mar. 20, 1945 |

Certificate of Correction

October 18, 1949

Patent No. 2,485,327

HOWARD SNOW

It is hereby certified that errors appear in the printed specification of the above numbered patent requiring correction as follows:

Column 1, line 34, for "outstandnig" read *outstanding*; column 5, line 24, for the word "reselected" read *selected*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*